United States Patent
Nakamura et al.

(10) Patent No.: US 12,451,486 B2
(45) Date of Patent: Oct. 21, 2025

(54) ENERGY STORAGE DEVICE AND ENERGY STORAGE APPARATUS

(71) Applicant: GS Yuasa International Ltd., Kyoto (JP)

(72) Inventors: Yuta Nakamura, Kyoto (JP); Yohei Shibata, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 707 days.

(21) Appl. No.: 17/778,740

(22) PCT Filed: Nov. 20, 2020

(86) PCT No.: PCT/JP2020/043408
§ 371 (c)(1),
(2) Date: May 20, 2022

(87) PCT Pub. No.: WO2021/100858
PCT Pub. Date: May 27, 2021

(65) Prior Publication Data
US 2023/0055952 A1    Feb. 23, 2023

(30) Foreign Application Priority Data
Nov. 22, 2019 (JP) .................. 2019-211061

(51) Int. Cl.
*H01M 4/525*    (2010.01)
*H01M 4/131*    (2010.01)
(Continued)

(52) U.S. Cl.
CPC .......... *H01M 4/525* (2013.01); *H01M 4/131* (2013.01); *H01M 4/505* (2013.01); *H01M 10/0525* (2013.01); *H01M 2004/028* (2013.01)

(58) Field of Classification Search
CPC ...... H01M 4/525; H01M 4/505; H01M 4/131; H01M 10/0525; H01M 2004/028
See application file for complete search history.

(56) References Cited

U.S. PATENT DOCUMENTS

| 8,928,286 B2 | 1/2015 | Amiruddin et al. |
| 9,159,990 B2 | 10/2015 | Amiruddin et al. |

(Continued)

FOREIGN PATENT DOCUMENTS

| JP | 8-138670 A | 5/1996 |
| JP | 2001-102091 | * 4/2001 |

(Continued)

OTHER PUBLICATIONS

International Search Report (ISR) dated Feb. 9, 2021 filed in PCT/JP2020/043408.

*Primary Examiner* — Laura Weiner
(74) *Attorney, Agent, or Firm* — RANKIN, HILL & CLARK LLP

(57) ABSTRACT

An energy storage device according to an aspect of the present invention includes: a positive electrode including a positive active material layer; a negative electrode; and a nonaqueous electrolyte, the positive active material layer includes boron and aluminum, and a maximum voltage width that is a difference between a charge upper limit voltage and a discharge lower limit voltage under normal usage is 1.1 V or less.

1 Claim, 2 Drawing Sheets

(51) Int. Cl.
  *H01M 4/505*      (2010.01)
  *H01M 10/0525*    (2010.01)
  *H01M 4/02*       (2006.01)

(56) References Cited

U.S. PATENT DOCUMENTS

| | | | |
|---|---|---|---|
| 9,553,301 | B2 | 1/2017 | Amiruddin et al. |
| 9,764,962 | B2 * | 9/2017 | Imahashi .............. H01M 4/525 |
| 2012/0056590 | A1 | 3/2012 | Amiruddin et al. |
| 2012/0176097 | A1 | 7/2012 | Takezawa et al. |
| 2013/0043843 | A1 | 2/2013 | Amiruddin et al. |
| 2015/0325838 | A1 | 11/2015 | Tamaki et al. |
| 2015/0364748 | A1 | 12/2015 | Amiruddin et al. |
| 2017/0047613 | A1 | 2/2017 | Iwama et al. |
| 2020/0266441 | A1 | 8/2020 | Yoshihara et al. |

FOREIGN PATENT DOCUMENTS

| | | |
|---|---|---|
| JP | 2012-174546 A | 9/2012 |
| JP | 2012-204036 A | 10/2012 |
| JP | 2013539594 A | 10/2013 |
| JP | 2014212034 A | 11/2014 |
| JP | 2015-88343 A | 5/2015 |
| JP | 2016-24879 A | 2/2016 |
| JP | 2016-33854 A | 3/2016 |
| JP | 2020-136264 A | 8/2020 |
| WO | 2011/033781 A1 | 3/2011 |

* cited by examiner

ENERGY STORAGE DEVICE AND ENERGY STORAGE APPARATUS

TECHNICAL FIELD

The present invention relates to an energy storage device and an energy storage apparatus.

BACKGROUND ART

Nonaqueous electrolyte secondary batteries typified by lithium ion secondary batteries are widely used for electronic devices such as personal computers and communication terminals, motor vehicles, and the like since these secondary batteries have a high energy density. The nonaqueous electrolyte secondary batteries generally include a pair of electrodes, which are electrically separated from each other by a separator, and a nonaqueous electrolyte interposed between the electrodes, and are configured to allow ions to be transferred between the two electrodes for charge-discharge. Capacitors such as lithium ion capacitors and electric double-layer capacitors are also widely in use as energy storage devices except for the nonaqueous electrolyte secondary batteries.

For example, Patent Document 1 describes that a coating with an oxide containing aluminum and boron is uniformly formed on the surface of a positive active material such as a lithium-containing composite oxide, thereby inhibiting a reaction between the positive active material and a nonaqueous electrolyte solution.

PRIOR ART DOCUMENT

Patent Document

Patent Document 1: JP-A-2012-204036

SUMMARY OF THE INVENTION

Problems to be Solved by the Invention

Energy storage devices are typically known, when the devices are repeatedly subjected to charge-discharge (hereinafter, also referred to as a "charge-discharge cycle"), to decrease in discharge capacity (hereinafter, also referred to simply as a "capacity") or swell due to various factors. In contrast, such energy storage devices as described above require the expansion of the working voltage range for further increasing the energy density. The inventors of the present invention have, however, found the following. More specifically, when the working voltage range is expanded (that is, when the difference between the charge upper limit voltage and the discharge lower limit voltage is set to be large), the positive active material particles included in the energy storage device increase in degree of expansion and shrinkage due to charge-discharge. When the positive active material particles increase in degree of expansion and shrinkage, the positive active material particles are more likely to be cracked, and the positive active material particles decrease in current collectability, and as a result, the capacity is more likely to decrease due to a long-term charge-discharge cycle. Furthermore, when the positive active material particles are cracked, the positive active material particles are not allowed to shrink, and the positive active material layer is expanded, and thus, the energy storage device itself is more likely to swell due to a long-term charge-discharge cycle. As a result of intensive studies made by the inventors of the present invention, it has been found that even the positive active material proposed in the patent document described above does not necessarily achieve an adequate effect depending on the working voltage range.

The present invention has been made in view of the foregoing circumstances, and an object of the present invention is to provide an energy storage device and an energy storage apparatus that are effectively improved not to swell in addition to being improved not to have a capacity decreased due to a long-term charge-discharge cycle.

Means for Solving the Problems

An energy storage device according to an aspect of the present invention includes: a positive electrode including a positive active material layer; a negative electrode; and a nonaqueous electrolyte, the positive active material layer includes boron and aluminum, and a maximum voltage width that is a difference between a charge upper limit voltage and a discharge lower limit voltage under normal usage is 1.1 V or less.

An energy storage apparatus according to another aspect of the present invention is an energy storage apparatus including a plurality of energy storage devices, in which each of the plurality of energy storage devices includes a positive electrode including a positive active material layer, a negative electrode, and a nonaqueous electrolyte, the positive active material layer includes boron and aluminum, and the plurality of energy storage devices are controlled such that a maximum voltage width that is a difference between a charge upper limit voltage and a discharge lower limit voltage under normal usage is 1.1 V or less.

Advantages of the Invention

The energy storage device according to an aspect of the present invention the energy storage apparatus according to another aspect of the present invention can provide an energy storage device and an energy storage apparatus that are effectively improved not to swell in addition to being improved not to have a capacity decreased due to a long-term charge-discharge cycle.

MODE FOR CARRYING OUT THE INVENTION

Figure 1:
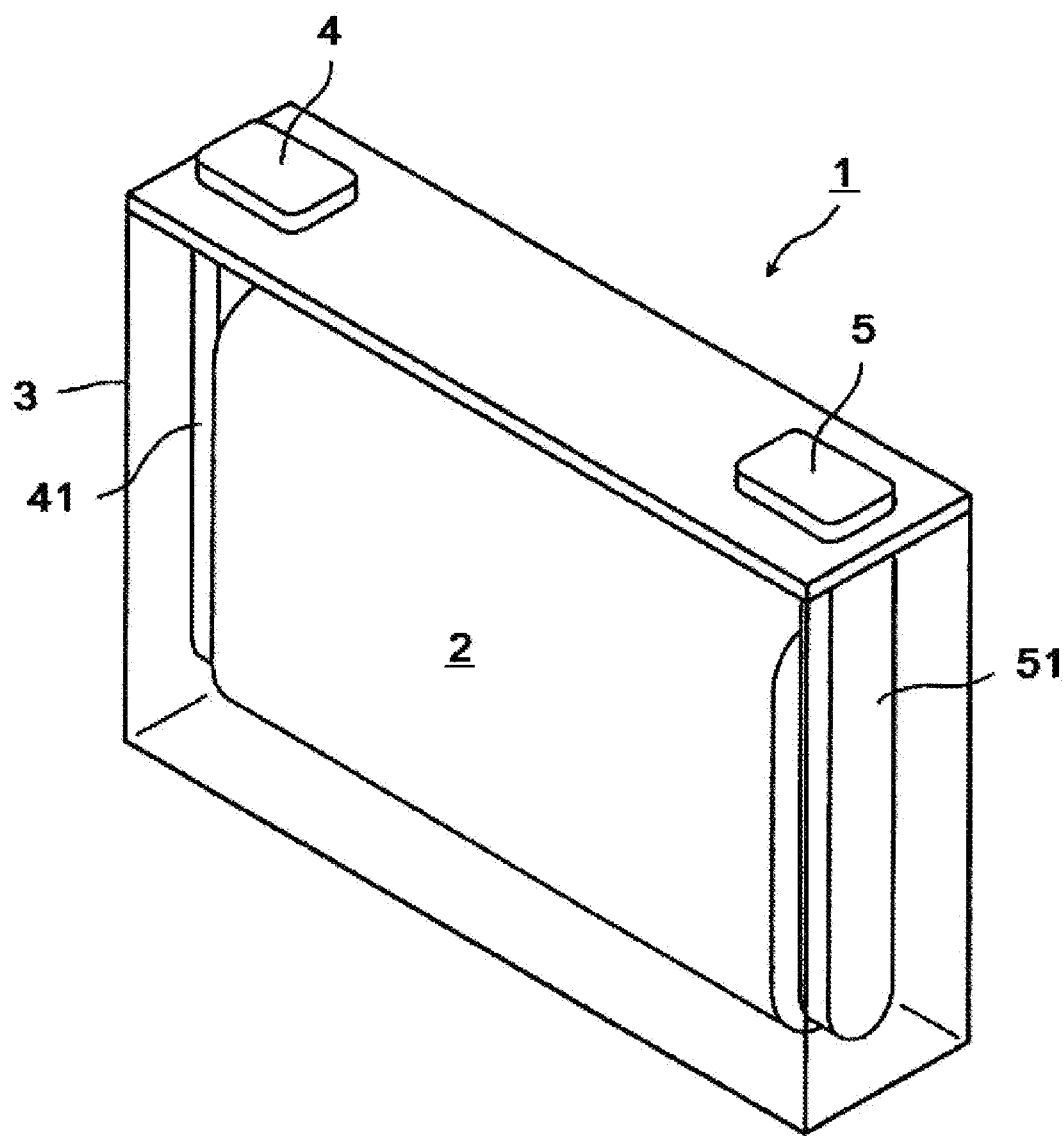
FIG. 1 is an external perspective view illustrating an embodiment of an energy storage device.

First, an outline of an energy storage device disclosed in the present specification will be described.

An energy storage device according to an aspect of the present invention includes: a positive electrode including a positive active material layer; a negative electrode; and a nonaqueous electrolyte solution, the positive active material layer includes boron and aluminum, and a maximum voltage width that is a difference between a charge upper limit voltage and a discharge lower limit voltage under normal usage is 1.1 V or less.

The energy storage device according to an aspect of the present invention can provide an energy storage device that is effectively improved not to swell in addition to being improved not to have a capacity decreased due to a long-term charge-discharge cycle. Although the reason for this is not clear, the following reason is presumed. For conventional energy storage devices, attempts have been made to suppress decreases in the capacities of the energy storage devices due to charge-discharge cycles by inhibiting a reaction between a positive active material and a nonaqueous electrolyte (nonaqueous electrolyte solution) or suppressing a change in the crystal structure of the positive active material due to a charge-discharge cycle. When the working voltage range is expanded, however, the degree of expansion of the positive active material increases with charge-discharge as mentioned above. As the result of causing the positive active material to be cracked or the like by the increased degree of expansion of the positive active material, the decreased current collectability of the positive active material particles, the expansion thereof, and the expansion of the positive electrode active material layer cause, due to a long-term charge-discharge cycle, the capacity of the energy storage device to be decreased, and the energy storage device to be swollen. In contrast, the energy storage device according to an aspect of the present invention, in which the positive active material layer includes boron and aluminum, and the maximum voltage width that is the difference between the charge upper limit voltage and the discharge lower limit voltage under normal usage is 1.1 V or less, is presumed to suppresses cracks and the like of the positive active material, thus suppressing the decreased current collectability of the positive active material particles, the expansion thereof, and the expansion of the positive electrode active material layer, and suppressing the swelling of the energy storage device in addition to the decrease in the capacity of the energy storage device with a long-term charge-discharge cycle.

The positive active material layer may include, as a positive active material, a lithium transition metal composite oxide containing cobalt, manganese, and nickel, and the atomic ratio of nickel to the total of cobalt, manganese, and nickel in the lithium transition metal composite oxide may be 0.4 or more.

This energy storage device can provide an energy storage device that is more effectively improved not to be swollen in addition to being improved not to decrease the capacity due to a long-term charge-discharge cycle.

An energy storage apparatus according to another aspect of the present invention is an energy storage apparatus including a plurality of energy storage devices, in which each of the plurality of energy storage devices includes a positive electrode including a positive active material layer, a negative electrode, and a nonaqueous electrolyte solution, the positive active material layer includes boron and aluminum, and the plurality of energy storage devices are controlled such that a maximum voltage width that is a difference between a charge upper limit voltage and a discharge lower limit voltage under normal usage is 1.1 V or less.

The energy storage apparatus according to another aspect of the present invention can provide an energy storage apparatus that is effectively improved not to swell the energy storage devices in addition to being improved not to have a capacity decreased due to a long-term charge-discharge cycle.

The configuration of an energy storage device, the configuration of an energy storage apparatus, and a method for manufacturing the energy storage device according to an embodiment of the present invention, and other embodiments will be described in detail. The names of the respective constituent members (respective constituent elements) used in the respective embodiments may be different from the names of the respective constituent members (respective constituent elements) used in the background art.

<Configuration of Energy Storage Device>

An energy storage device according to an embodiment of the present invention includes: an electrode assembly including a positive electrode, a negative electrode, and a separator; a nonaqueous electrolyte; and a case that houses the electrode assembly and the nonaqueous electrolyte. The electrode assembly is typically a stacked type obtained by stacking a plurality of positive electrodes and a plurality of negative electrodes with a separator interposed therebetween, or a wound type obtained by winding a positive electrode and a negative electrode stacked with a separator interposed therebetween. The nonaqueous electrolyte is present to be contained in the positive electrode, the negative electrode, and the separator. A nonaqueous electrolyte secondary battery (hereinafter, also simply referred to as a "secondary battery") will be described as an example of the energy storage device.

(Positive Electrode)

The positive electrode has a positive substrate and a positive active material layer disposed directly on the positive substrate or over the positive substrate with an intermediate layer interposed therebetween.

The positive substrate has conductivity. Whether the positive substrate has "conductivity" or not is determined with the volume resistivity of $10^7$ Ω·cm measured in accordance with JIS-H-0505 (1975) as a threshold. As the material of the positive electrode substrate, a metal such as aluminum, titanium, tantalum, or stainless steel, or an alloy thereof is used. Among these, aluminum or an aluminum alloy is preferable from the viewpoint of electric potential resistance, high conductivity, and costs. Examples of the positive electrode substrate include a foil and a deposited film, and a foil is preferable from the viewpoint of costs. Therefore, the positive electrode substrate is preferably an aluminum foil or an aluminum alloy foil. Examples of the aluminum or aluminum alloy include A1085 and A3003 specified in JIS-H-4000 (2014).

The average thickness of the positive substrate is preferably 3 μm or more and 50 μm or less, more preferably 5 μm or more and 40 μm or less, still more preferably 8 μm or more and 30 μm or less, and particularly preferably 10 μm or more and 25 μm or less. When the average thickness of the positive substrate is within the above-described range, it is possible to enhance the energy density per volume of a secondary battery while increasing the strength of the positive substrate.

The intermediate layer is a layer arranged between the positive electrode substrate and the positive active material layer. The intermediate layer contains conductive particles such as carbon particles to reduce contact resistance between the positive electrode substrate and the positive active material layer. The configuration of the intermediate layer is not particularly limited, and includes, for example, a resin binder and conductive particles.

The positive active material layer includes a positive active material. The positive active material layer contains boron and aluminum. With the positive active material layer containing boron and aluminum, the maximum voltage width that is the difference between the charge upper limit voltage and the discharge lower limit voltage under normal usage is 1.1 V or less as described later, thereby allowing the energy storage device to be more effectively improved not to swell in addition to allowing the capacity of the energy storage device to be more effectively improved not to decrease due to a long-term charge-discharge cycle, than in the case of a positive active material layer containing boron and aluminum and the maximum voltage width being larger than 1.1 V. The boron and aluminum contained in the positive active material layer may, for example, be derived from the positive active material, and do not have to be derived from the positive active material. Specifically, for example, the positive active material may contain boron and/or aluminum, thereby providing the positive active material layer containing boron and/or aluminum. In addition, the nonaqueous electrolyte may contain a boron compound and/or an aluminum compound, and permeate the positive active material layer or react with the positive active material, thereby providing the positive active material layer containing boron and/or aluminum. Furthermore, the positive active material layer may contain a boron compound and/or an aluminum compound, thereby providing the positive active material layer containing boron and/or aluminum. The boron and aluminum contained in the positive active material layer are preferably contained in the form of a boron compound and an aluminum compound, or a compound containing boron and aluminum. Examples of the boron compound include a boric acid, oxides of boron such as a boron oxide, and compounds containing lithium and boron, such as a lithium tetrafluoroborate ($LiBF_4$), a lithium bis(oxalate)borate (LiBOB), and a lithium difluorooxalate borate (LiFOB). Examples of the aluminum compound include oxides of aluminum such as an aluminum oxide, hydroxides of aluminum such as an aluminum hydroxide, and compounds containing lithium and aluminum, such as a lithium tetrafluoride aluminate. In addition, the positive active material layer contains optional components such as a conductive agent, a binder (binding agent), a thickener, a filler, or the like as necessary.

The positive active material can be appropriately selected from known positive active materials. As the positive active material for a lithium ion secondary battery, a material capable of storing and releasing lithium ions is usually used. Examples of the positive active material include lithium-transition metal composite oxides having an α-$NaFeO_2$-type crystal structure, lithium-transition metal composite oxides having a spinel-type crystal structure, polyanion compounds, chalcogenides, and sulfur. Examples of the lithium-transition metal composite oxide having an α-$NaFeO_2$ type crystal structure include $Li[Li_xNi_{(1-x)}]O_2$ ($0 \leq x < 0.5$), $Li[Li_xNi_yCo_{(1-x-y)}]O_2$ ($0 \leq x < 0.5$, $0 < y < 1$), $Li[Li_xCo_{(1-x)}]O_2$ ($0 \leq x < 0.5$), $Li[Li_xNi_yMn_{(1-x-y)}]O_2$ ($0 \leq x < 0.5$, $0 < y < 1$), $Li[Li_xNi_yMn_\beta Co_{(1-x-y-\beta)}]O_2$ ($0 \leq x < 0.5$, $0 < y$, $0 < \beta$, $0.5 < y + \beta < 1$), and $Li[Li_xNi_yCo_\beta Al_{(1-x-y-\beta)}]O_2$ ($0 \leq x < 0.5$, $0 < y$, $0 < \beta$, $0.5 < y + \beta < 1$). Examples of the lithium-transition metal composite oxides having a spinel-type crystal structure include $Li_xMn_2O_4$ and $Li_xNi_yMn_{(2-y)}O_4$. Examples of the polyanion compounds include $LiFePO_4$, $LiMnPO_4$, $LiNiPO_4$, $LiCoPO_4$, $Li_3V_2(PO_4)_3$, $Li_2MnSiO_4$, and $Li_2CoPO_4F$. Examples of the chalcogenides include titanium disulfide, molybdenum disulfide, and molybdenum dioxide. A part of atoms or polyanions in these materials may be substituted with atoms or anion species composed of other elements. The surfaces of these materials may be coated with other materials. In the positive active material layer, one of these materials may be used singly or two or more of these materials may be used in mixture.

The positive active material may be a lithium-transition metal composite oxide containing cobalt, manganese, and nickel. In this case, the atomic ratio of nickel to the total of cobalt, manganese, and nickel in the lithium-transition metal composite oxide may be 0.4 or more, preferably 0.5 or more. When the atomic ratio of nickel to the total of cobalt, manganese, and nickel is equal to or more than the above lower limit (that is, when the ratio of nickel to cobalt, manganese, and nickel is relatively high), the expansion and shrinkage of the positive active material particles due to charge-discharge are larger than when the atomic ratio is less than the lower limit, and the capacity decrease and swelling of the energy storage device due to a long-term charge-discharge cycle tend to be relatively increased. Even when such a positive active material is used, the positive active material layer contains boron and aluminum, with the maximum voltage width of 1.1 V or less under normal usage, it is possible to more effectively suppress the swelling of the energy storage device in addition to the capacity decrease of the energy storage device due to a long-term charge-discharge cycle.

The positive active material is usually particles (powder). The average particle size of the positive active material particles is preferably 0.1 μm or more and 20 μm or less, for example. By setting the average particle size of the positive active material particles to be equal to or more than the above lower limit, the positive active material are easily produced or handled. By setting the average particle size of the positive active material to be equal to or less than the upper limit, the electron conductivity of the positive active material layer is improved. It is to be noted that in the case of using a composite of the positive active material and another material, the average particle size of the composite is regarded as the average particle size of the positive active material. The term "average particle size" means a value at which a volume-based integrated distribution calculated in accordance with JIS-Z-8819-2 (2001) is 50% based on a particle size distribution measured by a laser diffraction/scattering method for a diluted solution obtained by diluting particles with a solvent in accordance with JIS-Z-8825 (2013).

A crusher, a classifier, and the like are used to obtain a powder having a predetermined particle size. Examples of a crushing method include a method in which a mortar, a ball mill, a sand mill, a vibratory ball mill, a planetary ball mill, a jet mill, a counter jet mill, a whirling airflow type jet mill, or a sieve or the like is used. At the time of crushing, wet type crushing in the presence of water or an organic solvent such as hexane can also be used. As a classification method, a sieve or a wind force classifier or the like is used based on the necessity both in dry manner and in wet manner.

The positive active material particle may be composed of, for example, a central part and a covering part that covers at least a part of the central part. In this case, the central part of the particle of the positive active material may contain therein boron and/or aluminum. The central part of the positive active material particle contains therein boron and/or aluminum, thereby allowing the capacity of the energy storage device to be more effectively improved not to decrease due to a charge-discharge cycle. The mechanism thereof is not necessarily clear, but is presumed as follows. More specifically, when the charge-discharge cycle is repeated, the positive active material particles will be cracked, and the cracks will form new surfaces at the surfaces of the positive active material particles. At the new surfaces, a reaction between the positive active material and the nonaqueous electrolyte is likely to be developed, and the reaction is presumed to cause a change in the crystal structure of the positive active material, resulting in a decrease in capacity. It is believed that the central part of the positive active material particle contains therein boron and/ or aluminum, thereby allowing the above-described change in crystal structure to be effectively suppressed.

The content of the positive active material in the positive active material layer is preferably 50% by mass or more and 99% by mass or less, more preferably 70% by mass or more and 98% by mass or less, further preferably 80% by mass or more and 95% by mass or less. When the content of the positive active material is in the above range, it is possible to achieve both high energy density and productivity of the positive active material layer.

The conductive agent is not particularly limited as long as it is a material exhibiting conductivity. Examples of such a conductive agent include carbonaceous materials, metals, and conductive ceramics. Examples of the carbonaceous materials include graphite, non-graphitic carbon, and graphene-based carbon. Examples of the non-graphitic carbon include carbon nanofibers, pitch-based carbon fibers, and carbon black. Examples of the carbon black include furnace black, acetylene black, and ketjen black. Examples of the graphene-based carbon include graphene, carbon nanotubes (CNTs), and fullerene. Examples of the shape of the conductive agent include a powdery shape and a fibrous shape. As the conductive agent, one of these materials may be used singly or two or more of these materials may be used in mixture. These materials may be composited and used. For example, a material obtained by compositing carbon black with CNT may be used. Among these, carbon black is preferable from the viewpoint of electron conductivity and coatability, and in particular, acetylene black is preferable.

The content of the conductive agent in the positive active material layer is preferably 1% by mass or more and 10% by mass or less, more preferably 3% by mass or more and 9% by mass or less. By setting the content of the conductive agent in the above range, the energy density of the secondary battery can be enhanced.

Examples of the binder include: thermoplastic resins such as fluororesin (polytetrafluoroethylene (PTFE), polyvinylidene fluoride (PVDF), etc.), polyethylene, polypropylene, polyacryl, and polyimide; elastomers such as an ethylene-propylene-diene rubber (EPDM), sulfonated EPDM, a styrene butadiene rubber (SBR), and a fluororubber; and polysaccharide polymers.

The content of the binder in the positive active material layer is preferably 1% by mass or more and 10% by mass or less, more preferably 3% by mass or more and 9% by mass or less. When the content of the binder is in the above range, the active material can be stably held.

Examples of the thickener include polysaccharide polymers such as carboxymethylcellulose (CMC) and methylcellulose. When the thickener has a functional group that is reactive with lithium and the like, the functional group may be deactivated by methylation or the like in advance.

The filler is not particularly limited. Examples of the filler include polyolefins such as polypropylene and polyethylene, inorganic oxides such as silicon dioxide, alumina, titanium dioxide, calcium oxide, strontium oxide, barium oxide, magnesium oxide and aluminosilicate, hydroxides such as magnesium hydroxide, calcium hydroxide and aluminum hydroxide, carbonates such as calcium carbonate, hardly soluble ionic crystals of calcium fluoride, barium fluoride, and barium sulfate, nitrides such as aluminum nitride and silicon nitride, and substances derived from mineral resources, such as talc, montmorillonite, boehmite, zeolite, apatite, kaolin, mullite, spinel, olivine, sericite, bentonite and mica, or artificial products thereof.

The positive active material layer may contain a typical nonmetal element such as N, P, F, Cl, Br, or I, a typical metal element such as Li, Na, Mg, K, Ca, Zn, Ga, Ge, Sn, Sr, and Ba or a transition metal element such as Sc, Ti, V, Cr, Mn, Fe, Co, Ni, Cu, Mo, Zr, Nb, or W as a component other than the positive active material, the conductive agent, the binder, the thickener, and the filler.

The positive electrode may include an inorganic layer formed on the positive active material layer, besides the above-described positive substrate and the positive active material layer disposed directly on the positive substrate or over the substrate with the intermediate layer interposed therebetween. The inorganic layer may include, for example, inorganic particles, a filler, and a binder. It is to be noted that in this specification, the inorganic layer formed on the positive active material layer as described above is not included in the positive active material layer.

(Negative Electrode)

The negative electrode has a negative substrate and a negative active material layer disposed directly on the negative substrate or over the negative substrate with an intermediate layer interposed therebetween. The configuration of the intermediate layer is not particularly limited, and for example can be selected from the configurations exemplified for the positive electrode.

The negative substrate exhibits conductivity. As the material of the negative substrate, a metal such as copper, nickel, stainless steel, nickel-plated steel, or aluminum, or an alloy thereof is used. Among them, copper or a copper alloy is preferable. Examples of the negative substrate include a foil and a vapor deposited film, and a foil is preferable from the viewpoint of cost. Therefore, the negative substrate is preferably a copper foil or a copper alloy foil. Examples of the copper foil include a rolled copper foil and an electrolytic copper foil.

The average thickness of the negative substrate is preferably 2 µm or more and 35 µm or less, more preferably 3 µm or more and 30 µm or less, still more preferably 4 µm or more and 25 µm or less, particularly preferably 5 µm or more and 20 µm or less. When the average thickness of the negative substrate is within the above-described range, it is possible to enhance the energy density per volume of a secondary battery while increasing the strength of the negative substrate.

The negative active material layer contains a negative active material. The negative active material layer contains optional components such as a conductive agent, a binder, a thickener, and a filler, if necessary. The optional components such as a conductive agent, a binder, a thickener, and a filler can be selected from the materials exemplified for the positive electrode.

The negative active material layer may contain a typical nonmetal element such as B, N, P, F, Cl, Br, or I, a typical metal element such as Li, Na, Mg, Al, K, Ca, Zn, Ga, Ge, Sn, Sr, and Ba or a transition metal element such as Sc, Ti, V, Cr, Mn, Fe, Co, Ni, Cu, Mo, Zr, Ta, Hf, Nb, or W as a component other than the negative active material, the conductive agent, the binder, the thickener, and the filler.

The negative active material can be appropriately selected from known negative active materials. As the negative active material for a lithium ion secondary battery, a material capable of absorbing and releasing lithium ions is usually used. Examples of the negative active material include metallic Li; metals or metalloids such as Si and Sn; metal oxides or metalloid oxides such as an Si oxide, a Ti oxide, and an Sn oxide; titanium-containing oxides such as $Li_4Ti_5O_{12}$, $LiTiO_2$, and $TiNb_2O_7$; a polyphosphoric acid compound; silicon carbide; and carbon materials such as graphite and non-graphitic carbon (easily graphitizable carbon or hardly graphitizable carbon). Among these materials, graphite and non-graphitic carbon are preferable. In the negative active material layer, one of these materials may be used singly, or two or more of these materials may be mixed and used.

The term "graphite" refers to a carbon material in which an average lattice distance ($d_{002}$) of the (002) plane determined by an X-ray diffraction method before charge-discharge or in a discharged state is 0.33 nm or more and less than 0.34 nm. Examples of the graphite include natural graphite and artificial graphite. Artificial graphite is preferable from the viewpoint that a material having stable physical properties can be obtained.

The term "non-graphitic carbon" refers to a carbon material in which the average lattice distance ($d_{002}$) of the (002) plane determined by the X-ray diffraction method before charge-discharge or in the discharged state is 0.34 nm or more and 0.42 nm or less. Examples of the non-graphitic carbon include hardly graphitizable carbon and easily graphitizable carbon. Examples of the non-graphitic carbon include a resin-derived material, a petroleum pitch or a material derived from petroleum pitch, a petroleum coke or a material derived from petroleum coke, a plant-derived material, and an alcohol derived material.

Here, the "discharged state" refers to a state where an open circuit voltage is 0.7 V or more in a unipolar battery using a negative electrode, containing a carbon material as a negative active material, as a working electrode and using metallic Li as a counter electrode. Since the potential of the metallic Li counter electrode in an open circuit state is substantially equal to an oxidation/reduction potential of Li, the open circuit voltage in the unipolar battery is substantially equal to the potential of the negative electrode containing the carbon material with respect to the oxidation/reduction potential of Li. More specifically, the fact that the open circuit voltage in the unipolar battery is 0.7 V or more means that lithium ions that can be occluded and released in association with charge-discharge are sufficiently released from the carbon material that is the negative active material.

The "hardly graphitizable carbon" refers to a carbon material in which the $d_{002}$ is 0.36 nm or more and 0.42 nm or less.

The "easily graphitizable carbon" refers to a carbon material in which the $d_{002}$ is 0.34 nm or more and less than 0.36 nm.

The negative active material is typically particles (powder). The average particle size of the negative active material particles can be, for example, 1 nm or more and 100 µm or less. When the negative active material is a carbon material, a titanium-containing oxide, or a polyphosphoric acid compound, the average particle size thereof may be 1 µm or more and 100 µm or less. When the negative active material is Si, Sn, an oxide of Si, an oxide of Sn, or the like, the average particle size thereof may be 1 nm or more and 1 µm or less. By setting the average particle size of the negative active material particles to be equal to or greater than the lower limit, the negative active material is easily produced or handled. By setting the average particle size of the negative active material particles to be equal to or less than the upper limit, the electron conductivity of the positive active material layer is improved. A crusher, a classifier, and the like are used to obtain a powder having a predetermined particle size. A crushing method and a powder classification method can be selected from, for example, the methods exemplified for the positive electrode. When the negative active material is a metal such as metal Li, the negative active material may have the form of foil.

The content of the negative active material in the negative active material layer is preferably 60% by mass or more and 99% by mass or less, more preferably 90% by mass or more and 98% by mass or less. When the content of the negative active material is in the above range, it is possible to achieve both high energy density and productivity of the negative active material layer.

(Separator)

The separator can be appropriately selected from known separators. As the separator, for example, a separator composed of only a substrate layer, a separator in which a heat resistant layer containing heat resistant particles and a binder is formed on one surface or both surfaces of the substrate layer, or the like can be used. Examples of the form of the substrate layer of the separator include a woven fabric, a nonwoven fabric, and a porous resin film. Among these forms, a porous resin film is preferable from the viewpoint of strength, and a nonwoven fabric is preferable from the viewpoint of liquid retaining property of the nonaqueous electrolyte. As the material of the substrate layer of the separator, a polyolefin such as polyethylene or polypropylene is preferable from the viewpoint of a shutdown function, and polyimide, aramid or the like is preferable from the viewpoint of resistance to oxidation and decomposition. As the substrate layer of the separator, a material obtained by combining these resins may be used.

The heat resistant particles included in the heat resistant layer preferably have a mass loss of 5% or less in the case of temperature increase from room temperature to 500° C. under the air atmosphere of 1 atm, and more preferably have a mass loss of 5% or less in the case of temperature increase from room temperature to 800° C. Inorganic compounds can be mentioned as materials whose mass loss is a predetermined value or less. Examples of the inorganic compound include oxides such as iron oxide, silicon oxide, aluminum oxide, titanium dioxide, barium titanate, zirconium oxide, calcium oxide, strontium oxide, barium oxide, magnesium oxide and aluminosilicate; hydroxides such as magnesium hydroxide, calcium hydroxide and aluminum hydroxide; nitrides such as aluminum nitride and silicon nitride; carbonates such as calcium carbonate; sulfates such as barium sulfate; hardly soluble ionic crystals of calcium fluoride, barium fluoride, and the like; covalently bonded crystals such as silicon and diamond; and substances derived from mineral resources, such as talc, montmorillonite, boehmite, zeolite, apatite, kaolin, mullite, spinel, olivine, sericite, bentonite and mica, and artificial products thereof. As the inorganic compound, a simple substance or a complex of these substances may be used alone, or two or more thereof may be mixed and used. Among these inorganic compounds, silicon oxide, aluminum oxide, or aluminosilicate is preferable from the viewpoint of safety of the energy storage device.

A porosity of the separator is preferably 80% by volume or less from the viewpoint of strength, and is preferably 20% by volume or more from the viewpoint of discharge performance. The "porosity" herein is a volume-based value, and means a value measured with a mercury porosimeter.

As the separator, a polymer gel composed of a polymer and a nonaqueous electrolyte may be used. Examples of the polymer include polyacrylonitrile, polyethylene oxide, polypropylene oxide, polymethyl methacrylate, polyvinyl acetate, polyvinylpyrrolidone, and polyvinylidene fluoride. The use of polymer gel has the effect of suppressing liquid leakage. As the separator, a polymer gel may be used in combination with a porous resin film, a nonwoven fabric, or the like as described above.

(Nonaqueous Electrolyte)

The nonaqueous electrolyte can be appropriately selected from known nonaqueous electrolytes. As the nonaqueous electrolyte, a nonaqueous electrolyte solution may be used. The nonaqueous electrolyte solution contains a nonaqueous solvent and an electrolyte salt dissolved in the nonaqueous solvent.

The nonaqueous solvent can be appropriately selected from known nonaqueous solvents. Examples of the nonaqueous solvent include cyclic carbonates, chain carbonates, carboxylic acid esters, phosphoric acid esters, sulfonic acid esters, ethers, amides, and nitriles. As the nonaqueous solvent, those in which some hydrogen atoms contained in these compounds are substituted with halogen may be used.

Examples of the cyclic carbonate include ethylene carbonate (EC), propylene carbonate (PC), butylene carbonate (BC), vinylene carbonate (VC), vinylethylene carbonate (VEC), chloroethylene carbonate, fluoroethylene carbonate (FEC), difluoroethylene carbonate (DFEC), styrene carbonate, 1-phenylvinylene carbonate, and 1,2-diphenylvinylene carbonate. Among these examples, EC is preferable.

Examples of the chain carbonate include diethyl carbonate (DEC), dimethyl carbonate (DMC), ethyl methyl carbonate (EMC), diphenyl carbonate, trifluoroethyl methyl carbonate, and bis(trifluoroethyl)carbonate. Among these examples, EMC is preferable.

As the nonaqueous solvent, it is preferable to use the cyclic carbonate or the chain carbonate, and it is more preferable to use the cyclic carbonate and the chain carbonate in combination. By using the cyclic carbonate, dissociation of the electrolyte salt can be promoted to improve ionic conductivity of the nonaqueous electrolyte solution. By using the chain carbonate, viscosity of the nonaqueous electrolyte solution can be suppressed to be low. When the cyclic carbonate and the chain carbonate are used in combination, a volume ratio of the cyclic carbonate to the chain carbonate (cyclic carbonate:chain carbonate) is preferably in a range from 5:95 to 50:50, for example.

The electrolyte salt can be appropriately selected from known electrolyte salts. Examples of the electrolyte salt include a lithium salt, a sodium salt, a potassium salt, a magnesium salt, and an onium salt. Among them, the lithium salt is preferable.

Examples of the lithium salt include inorganic lithium salts such as $LiPF_6$, $LiPO_2F_2$, $LiBF_4$, $LiClO_4$, and $LiN(SO_2F)_2$, and lithium salts having a halogenated hydrocarbon group, such as $LiSO_3CF_3$, $LiN(SO_2CF_3)_2$, $LiN(SO_2C_2F_5)_2$, $LiN(SO_2CF_3)(SO_2C_4F_9)$, $LiC(SO_2CF_3)_3$ and $LiC(SO_2C_2F_5)_3$. Among these examples, an inorganic lithium salt is preferable, and $LiPF_6$ is more preferable.

The content of the electrolyte salt in the nonaqueous electrolyte solution is, at 20° C. under 1 atm, preferably 0.1 $mol/dm^3$ or more and 2.5 $mol/dm^3$ or less, more preferably 0.3 $mol/dm^3$ or more and 2.0 $mol/dm^3$ or less, further preferably 0.5 $mol/dm^3$ or more and 1.7 $mol/dm^3$ or less, and particularly preferably 0.7 $mol/dm^3$ or more and 1.5 $mol/dm^3$ or less. The content of the electrolyte salt falls within the above range, thereby allowing the ionic conductivity of the nonaqueous electrolyte solution to be increased.

The nonaqueous electrolyte solution may contain an additive, besides the nonaqueous solvent and the electrolyte salt. Examples of the additive include salts having an oxalic acid group, such as lithium bis(oxalate)borate (LiBOB), lithium difluorooxalate borate (LiFOB), and lithium bis(oxalate) difluorophosphate (LiFOP); aromatic compounds such as biphenyl, alkylbiphenyl, terphenyl, partly hydrogenated terphenyl, cyclohexylbenzene, t-butylbenzene, t-amylbenzene, diphenyl ether, and dibenzofuran; partial halides of the aromatic compounds such as 2-fluorobiphenyl, o-cyclohexylfluorobenzene, and p-cyclohexylfluorobenzene; halogenated anisole compounds such as 2,4-difluoroanisole, 2,5-difluoroanisole, 2,6-difluoroanisole, and 3,5-difluoroanisole; succinic anhydride, glutaric anhydride, maleic anhydride, citraconic anhydride, glutaconic anhydride, itaconic anhydride, cyclohexanedicarboxylic anhydride; ethylene sulfite, propylene sulfite, dimethyl sulfite, propane sultone, propene sultone, butane sultone, methyl methanesulfonate, busulfan, methyl toluenesulfonate, dimethyl sulfate, ethylene sulfate, sulfolane, dimethyl sulfone, diethyl sulfone, dimethylsulfoxide, diethyl sulfoxide, tetramethylene sulfoxide, diphenyl sulfide, 4,4'-bis(2,2-dioxo-1,3,2-dioxathiolane, 4-methylsulfonyloxymethyl-2,2-dioxo-1,3,2-dioxathiolane, thioanisole, diphenyl disulfide, dipyridinium disulfide, perfluorooctane, tristrimethylsilyl borate, tristrimethylsilyl phosphate, tetrakistrimethylsilyl titanate, lithium monofluorophosphate, and lithium difluorophosphate. These additives may be used singly, or two or more thereof may be used in mixture.

As described above, besides the positive active material containing boron and the positive active material layer containing a boron compound for providing the positive active material layer containing boron therein, the nonaqueous electrolyte may contain a boron compound for providing the positive active material layer containing boron therein. Specifically, the nonaqueous electrolyte solution may contain a boron compound for providing the positive active material layer containing boron therein. In such a case, at least one of the nonaqueous solvent, electrolyte salt, and additive described above contains boron, thereby allowing for the positive active material layer containing boron therein. Examples of the electrolyte salt containing boron include $LiBF_4$. Examples of the boron-containing additive include lithium bis(oxalate)borate (LiBOB) and lithium difluorooxalate borate (LiFOB). Whether the positive active material layer contains boron and aluminum or not can be confirmed by ICP-MS (Inductively Coupled Plasma Mass Spectrometer).

The content of the additive contained in the nonaqueous electrolyte solution is preferably 0.01% by mass or more and 10% by mass or less, more preferably 0.1% by mass or more and 7% by mass or less, still more preferably 0.2% by mass or more and 5% by mass or less, and particularly preferably 0.3% by mass or more and 3% by mass or less, with respect to a total mass of the nonaqueous electrolyte solution. The content of the additive falls within the above range, thereby making it possible to improve capacity retention performance or cycle performance after high-temperature storage, and to further improve safety.

As the nonaqueous electrolyte, a solid electrolyte may be used, or a nonaqueous electrolyte solution and a solid electrolyte may be used in combination.

The solid electrolyte can be selected from any material having ionic conductivity such as lithium, sodium and calcium and being solid at room temperature (for example, 15° C. to 25° C.). Examples of the solid electrolyte include sulfide solid electrolytes, oxide solid electrolytes, oxynitride solid electrolytes, and polymer solid electrolytes.

Examples of the sulfide solid electrolyte include, in the case of a lithium ion secondary battery, $Li_2S$—$P_2S_5$, LiI—$Li_2S$—$P_2S_5$, and $Li_{10}Ge$—$P_2S_{12}$.

The shape of the energy storage device of the present embodiment is not particularly limited, and examples thereof include cylindrical batteries, prismatic batteries, flat batteries, coin batteries and button batteries.

FIG. 1 shows an energy storage device 1 (nonaqueous electrolyte energy storage device) as an example of a prismatic battery. FIG. 1 is a view showing an inside of a case in a perspective manner. An electrode assembly 2 having a positive electrode and a negative electrode which are wound with a separator interposed therebetween is housed in a prismatic case 3. The positive electrode is electrically connected to a positive electrode terminal 4 through a positive electrode lead 41. The negative electrode is electrically connected to a negative electrode terminal 5 via a negative electrode lead 51.

In the energy storage device according to the present embodiment, the maximum voltage width that is the difference between the charge upper limit voltage and the discharge lower limit voltage under normal usage is 1.1 V or less. The positive active material layer containing boron and aluminum and the maximum voltage width of 1.1 V or less under normal usage allow the energy storage device to be effectively improved not to swell in addition to allowing the capacity of the energy storage device to be effectively improved not to decrease due to a long-term charge-discharge cycle. The term "during normal usage" herein means use of the energy storage device while employing charge-discharge conditions recommended or specified in the energy storage device, and when a charger is prepared for the energy storage device, this term means use of the energy storage device by applying the charger. It is to be noted that in this specification, an oxidative reaction of releasing lithium ions and the like from the positive active material is referred to as "charge", whereas a reductive reaction of occluding lithium ions and the like in the positive active material is referred to as "discharge".

The maximum voltage width may be 1.1 V or less, and is preferably 1.0 V or less, more preferably 0.9 V or less. When the maximum voltage width is reduced, electric energy that can be extracted at one time by charge-discharge is reduced, but the energy storage device is more effectively improved not to decrease the capacities and not to swell due to a long-term charge/discharge cycle. Accordingly, the same energy storage device can be used long, thus allowing the replacement frequency of the energy storage device to be reduced, and then allowing the maintenance cost to be reduced.

<Configuration of Energy Storage Apparatus>

An energy storage apparatus according to another aspect of the present invention is an energy storage apparatus including a plurality of energy storage devices, in which each of the plurality of energy storage devices includes a positive electrode including a positive active material layer, a negative electrode, and a nonaqueous electrolyte, the positive active material layer includes boron and aluminum, and the plurality of energy storage devices are controlled such that a maximum voltage width that is a difference between a charge upper limit voltage and a discharge lower limit voltage under normal usage is 1.1 V or less. The same configuration as the above-described energy storage device according to an embodiment of the present invention can be employed for each of the plurality of energy storage devices.

The energy storage device of the present embodiment can be mounted as an energy storage apparatus (energy storage module) configured by assembling a plurality of energy storage devices 1 on a power source for automobiles such as electric vehicles (EV), hybrid vehicles (HEV), and plug-in hybrid vehicles (PHEV), a power source for electronic devices such as personal computers and communication terminals, or a power source for power storage, or the like.

Figure 2:
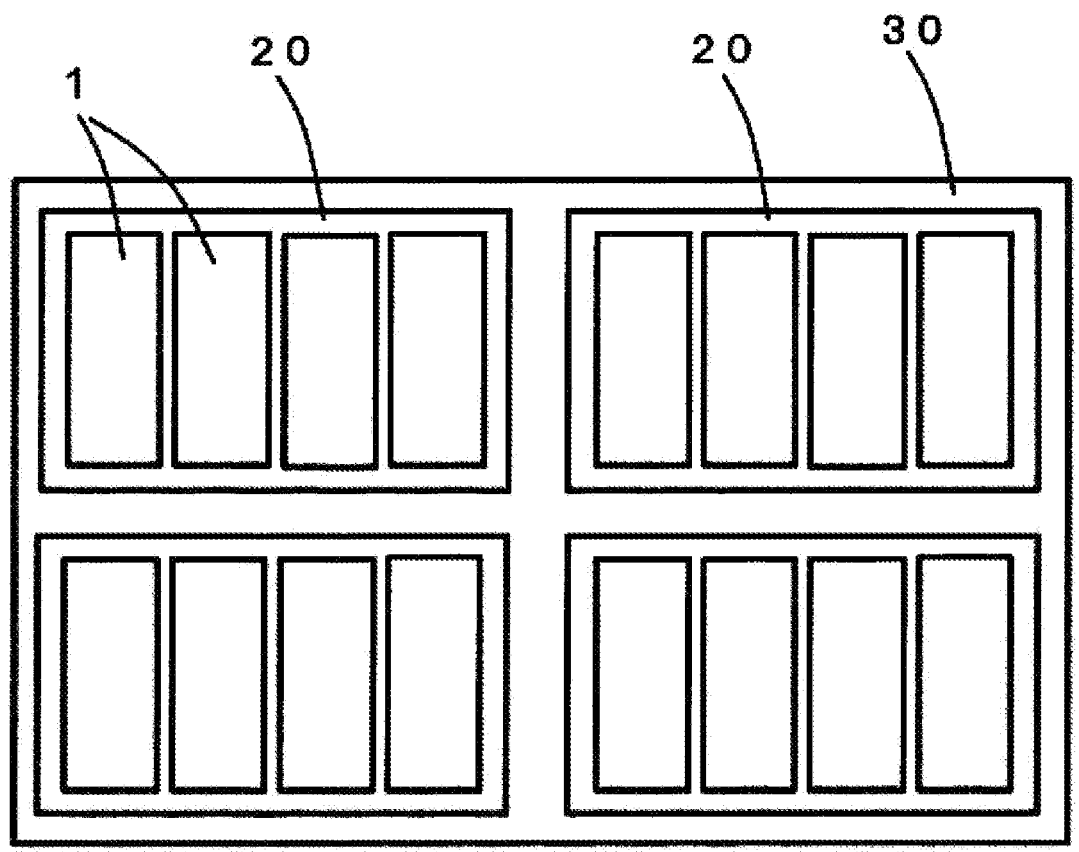
FIG. 2 is a schematic diagram showing an embodiment of an energy storage apparatus including a plurality of energy storage devices.

FIG. 2 illustrates an example of an energy storage system 30 formed by assembling energy storage apparatuses 20 in each of which a plurality of electrically connected energy storage devices 1 are assembled. The energy storage system 30 may include a busbar (not illustrated) for electrically connecting a plurality of energy storage devices 1, a busbar (not illustrated) for electrically connecting a plurality of energy storage apparatuses 20, and the like. The energy storage apparatus 20 or the energy storage system 30 may include a state monitor (not illustrated) for monitoring the state of the plurality of energy storage devices.

In the energy storage apparatus 20, the maximum voltage width of the plurality of energy storage devices 1 under normal usage is controlled to be 1.1 V or less. The energy storage apparatus 20 may include a voltage controller (not shown), and the maximum voltage width may be controlled by the voltage controller to 1.1 V or less. The maximum voltage width may be 1.1 V or less, and is preferably 1.0 V or less, more preferably 0.9 V or less.

The method for controlling the maximum voltage widths of the plurality of energy storage devices 1 is not particularly limited. For example, the voltage of each of the plurality of energy storage devices 1 included in the energy storage apparatus 20 may be controlled. Alternatively, the maximum voltage width may be controlled with two or more energy storage devices 1 as a block. Specifically, the potential difference between the positive electrode terminal at the highest potential and the negative electrode terminal at the lowest potential may be controlled among two or more energy storage devices 1 connected in series in the energy storage apparatus 20. In this case, the potential difference between the positive electrode terminal at the highest potential and the negative electrode terminal at the lowest potential is controlled to be equal to or less than the value obtained by multiplying the number of the plurality of energy storage devices connected in series by 1.1 V. It is to be noted that the number of the energy storage devices 1 connected in series is arbitrary, which is a unit for controlling the voltage. The method for controlling the voltage of the energy storage device 1 is not particularly limited, and any method can be employed.

Once the plurality of energy storage devices 1 are assembled to constitute an energy storage apparatus (that is, when the plurality of energy storage devices 1 are modularized), it is troublesome to replace the energy storage devices 1 constituting the energy storage apparatus, and in some cases, it is necessary to replace the energy storage apparatus as a unit. The energy storage apparatus according to the present embodiment is more effectively improved not to decrease the capacities of the energy storage devices and not to swell the energy storage devices due to a long-term charge-discharge cycle. Accordingly, the same energy storage device can be used longer, thus allowing the replacement frequency of the energy storage devices and the energy storage apparatus to be reduced, and then allowing the maintenance cost to be reduced.

<Method for Manufacturing Energy Storage Device>

A method for manufacturing the energy storage device of the present embodiment can be appropriately selected from known methods. The manufacturing method includes, for example, preparing an electrode assembly, preparing a nonaqueous electrolyte, and housing the electrode assembly and the nonaqueous electrolyte in a case. The preparation of the electrode assembly includes: preparing a positive electrode and a negative electrode, and forming an electrode assembly by stacking or winding the positive electrode and the negative electrode with a separator interposed therebetween.

Housing the nonaqueous electrolyte in a case can be appropriately selected from known methods. For example, when a nonaqueous electrolyte solution is used for the nonaqueous electrolyte, the nonaqueous electrolyte solution may be injected from an inlet formed in the case, followed by sealing the inlet.

Other Embodiments

It is to be noted that the energy storage device of the present invention is not limited to the embodiments described above, and various changes may be made without departing from the scope of the present invention. For example, the configuration according to one embodiment can be added to the configuration according to another embodiment, or a part of the configuration according to one embodiment can be replaced with the configuration according to another embodiment or a well-known technique. Furthermore, a part of the configuration according to one embodiment can be removed. In addition, a well-known technique can be added to the configuration according to one embodiment.

In the above embodiment, although the case where the energy storage device is used as a nonaqueous electrolyte secondary battery (for example, lithium ion secondary battery) that can be charged and discharged has been described, the type, shape, size, capacity, and the like of the energy storage device are arbitrary. The present invention can also be applied to capacitors such as various secondary batteries, electric double layer capacitors, and lithium ion capacitors.

While the electrode assembly with the positive electrode and the negative electrode stacked with the separator interposed therebetween has been described in the embodiment mentioned above, the electrode assembly does not have to include the separator. For example, the positive electrode and the negative electrode may be brought into direct contact with each other, with a non-conductive layer formed on the active material layer of the positive electrode or negative electrode.

EXAMPLES

Hereinafter, the present invention will be described more specifically with reference to Examples. The present invention is not limited to the following examples.

[Example 1] (Fabrication of Positive Electrode)

A positive composite paste containing N-methylpyrrolidone (NMP) as a dispersion medium was prepared with the use of a lithium transition metal composite oxide containing nickel, cobalt, and manganese (the atomic ratio of nickel to the total of nickel, cobalt, and manganese is 0.5) an aluminum compound, and a boron compound as a positive active material, acetylene black as a conductive agent, and a polyvinylidene fluoride as a binder. The positive composite paste was applied onto an aluminum foil as a positive substrate, and subjected to drying and pressing to fabricate a positive electrode including a formed positive active material layer containing boron and aluminum. The aluminum foil was provided with a positive active material layer unformed region where the positive active material layer was not formed partially. It is to be noted that the boron and aluminum in the positive active material layer are contained in the forms of the boron compound and aluminum compound, and the aluminum compound is not derived from the aluminum foil as a positive substrate.

(Fabrication of Negative Electrode)

Graphite was used as a negative active material to fabricate a negative electrode with a negative active material layer formed on a copper foil as a negative substrate. The copper foil was provided with a negative active material layer unformed region where the negative active material layer was not formed partially.

(Preparation of Separator)

As the separator, a polyethylene microporous film was prepared.

(Preparation of Nonaqueous Electrolyte)

A nonaqueous electrolyte was adjusted by dissolving LiPF$_6$ in a mixed solvent of an ethylene carbonate (EC), a propylene carbonate (PC), and an ethyl methyl carbonate (EMC) such that the salt concentration was 1.0 mol/dm$^3$.

(Fabrication of Energy Storage Device)

The positive electrode, negative electrode, and separator obtained in accordance with the above-mentioned procedure were stacked and then wound to obtain a wound-type electrode assembly. Thereafter, a positive electrode lead and a negative electrode lead were joined respectively to the positive active material layer unformed region of the positive electrode and the negative active material layer unformed region of the negative electrode. Thereafter, the electrode assembly was enclosed in a metallic prismatic case, the above-described nonaqueous electrolyte was injected into the case, and the case was sealed to obtain an energy storage device. It is to be noted that the maximum thickness of the energy storage device was 34 mm in the direction in which the positive electrode, the negative electrode, and the separator were stacked.

[Evaluation]

(Measurement of Initial Discharge Capacity)

For the obtained energy storage device, the initial charge-discharge capacity was measured under the following conditions. First, the energy storage device was charged up to 4.25 V at 25° C. at a constant current with a charge current of 1 C, and then subjected to constant voltage charge at 4.25 V with a current of 0.01 C regarded as an end condition. Thereafter, a rest time of 10 minutes was provided, and after the lapse of the rest period, the device was discharged at 25° C. to an end voltage of 2.75 V at a constant current with a discharge current of 0.33 C, and the discharge capacity in the case was regarded as an initial discharge capacity.

(Capacity Retention Ratio after Charge-Discharge Cycle)

After measuring the initial discharge capacity, a charge-discharge cycle test was performed at a temperature of 45° C. Specifically, constant current charge was performed up to 4.25 V at a charge current of 1 C, and constant voltage charge at 4.25 V was then performed with a current of 0.01 C regarded as an end condition. After the completion of the constant voltage charge, a rest time of 10 minutes was provided, and after the elapse of the rest period, constant current discharge was performed to an end voltage of 3.51 V at a discharge current of 1 C. After the completion of the constant current discharge, a rest time of 10 minutes was provided. Several hundred to several thousand cycles of charge-discharge were performed with the charge-discharge as one cycle. The discharge capacity and the maximum thickness of the energy storage device in the direction in which the positive electrode, the negative electrode, and the separator were stacked were checked every several hundred cycles under the same conditions as for the initial discharge capacity. With the proportion (percentage) of the discharge capacity after the charge-discharge cycles to the initial discharge capacity as a capacity retention ratio (%), the charge-discharge cycle was continued until the capacity retention ratio reached 80% or less, and the number of cycles in which the capacity retention ratio reached 80% was calculated by interpolation. In addition, the number of cycles in which the maximum thickness of the energy storage device reached 40 mm was calculated by interpolation.

Example 2, Comparative Examples 1 to 10

In accordance with the same procedures as in Example 1 except for the presence or absence of boron and aluminum contained in the positive active material layer and the maximum voltage width (the difference between the voltage in the case of constant voltage charge and the end voltage of constant current discharge) as shown in Tables 1 to 3, energy storage devices were fabricated, and subjected to the measurement of the initial discharge capacity and the charge-discharge cycle test. It is to be noted that the maximum voltage width was changed by changing the end voltage of the constant current discharge.

(Improvement Ratios of Capacity Retention Ratio and Thickness)

The improvement ratio of the capacity retention ratio with respect to the test example as a reference (hereinafter, also referred to simply as an "improvement ratio of capacity retention ratio") was calculated, based on the following formula:

Improvement ratio (%) of capacity retention ratio=
(the number of cycles in which the capacity retention ratio reaches 80% in each test example)/(the number of cycles in which the capacity retention ratio reaches 80% in the test example as a reference)×100−100

Improvement ratio of thickness (%)=(the number of cycles in which maximum thickness of the energy storage device reaches 40 mm in each test example)/(the number of cycles in which the maximum thickness of the energy storage device reaches 40 mm in the test example as a reference)×100−100

Tables 1 to 3 show the presence or absence of boron and aluminum in the positive active material layer, the maximum voltage width, the number of cycles in which the capacity retention ratio reaches 80%, the improvement ratio of the capacity retention ratio, the number of cycles in which the thickness reaches 40 mm, and the improvement ratio of the thickness in Examples 1 and 2 and Comparative Examples 1 to 10.

TABLE 1

| | Positive active material layer | | | Capacity retention ratio | | Thickness | |
|---|---|---|---|---|---|---|---|
| | Presence or absence of boron | Presence or absence of aluminum | Maximum voltage width (V) | Number of cycles in which capacity retention ratio reaches 80% | Improvement ratio (%) with respect to Comparative Example 1 | Number of cycles in which thickness reaches 40 mm | Improvement ratio (%) with respect to Comparative Example 1 |
| Comparative Example 1 | Absence | Absence | 0.74 | 1024 | 0 (reference) | 2050 | 0 (reference) |
| Comparative Example 2 | Presence | Absence | 0.74 | 2891 | 182 | 3000 | 46 |
| Comparative Example 3 | Absence | Presence | 0.74 | 1082 | 6 | 2250 | 10 |
| Example 1 | Presence | Presence | 0.74 | 3368 | 229 | 3600 | 76 |

As can be seen from Table 1, when the maximum voltage width is 1.1 V or less (0.74 V), the capacity retention ratio has been unexpectedly improved with the improvement ratio of 229% according to Example 1 containing both boron and aluminum, whereas the improvement ratio of the capacity retention ratio according to Comparative Example 2 containing only boron and the improvement ratio thereof according to Comparative Example 3 containing only aluminum are respectively 182% and 6%, based on Comparative Example 1 in which the positive active material layer contains neither boron nor aluminum. The energy storage device has been also unexpectedly improved not to swell with the improvement ratio of 76% according to Example 1 containing both boron and aluminum, whereas the improvement ratio of the maximum thickness of the energy storage device according to Comparative Example 2 containing only boron and the improvement ratio thereof according to Comparative Example 3 containing only aluminum are respectively 46% and 10%, based on Comparative Example 1 in which the positive active material layer contains neither boron nor aluminum.

TABLE 2

| | Positive active material layer | | | Capacity retention ratio | | Thickness | |
|---|---|---|---|---|---|---|---|
| | Presence or absence of boron | Presence or absence of aluminum | Maximum voltage width (V) | Number of cycles in which capacity retention ratio reaches 80% | Improvement ratio (%) with respect to Comparative Example 4 | Number of cycles in which thickness reaches 40 mm | Improvement ratio (%) with respect to Comparative Example 4 |
| Comparative Example 4 | Absence | Absence | 0.82 | 577 | 0 (reference) | 1400 | 0 (reference) |
| Comparative Example 5 | Presence | Absence | 0.82 | 2194 | 280 | 2500 | 79 |

TABLE 2-continued

|  | Positive active material layer | | Maximum voltage width (V) | Capacity retention ratio | | Thickness | |
|---|---|---|---|---|---|---|---|
|  | Presence or absence of boron | Presence or absence of aluminum |  | Number of cycles in which capacity retention ratio reaches 80% | Improvement ratio (%) with respect to Comparative Example 4 | Number of cycles in which thickness reaches 40 mm | Improvement ratio (%) with respect to Comparative Example 4 |
| Comparative Example 6 | Absence | Presence | 0.82 | 624 | 8 | 1500 | 7 |
| Example 2 | Presence | Presence | 0.82 | 2573 | 346 | 2800 | 100 |

As can be seen from Table 2, when the maximum voltage width is 1.1 V or less (0.84 V), the capacity retention ratio has been unexpectedly improved with the improvement ratio of 346% according to Example 2 containing both boron and aluminum, whereas the improvement ratio of the capacity retention ratio according to Comparative Example 5 containing only boron and the improvement ratio thereof according to Comparative Example 6 containing only aluminum are respectively 280% and 8%, based on Comparative Example 4 in which the positive active material layer contains neither boron nor aluminum. The energy storage device has been also unexpectedly improved not to swell with the improvement ratio of 100% according to Example 2 containing both boron and aluminum, whereas the improvement ratio of the maximum thickness of the energy storage device according to Comparative Example 5 containing only boron and the improvement ratio thereof according to Comparative Example 6 containing only aluminum are respectively 79% and 7%, based on Comparative Example 4 in which the positive active material layer contains neither boron nor aluminum.

there is no significant difference from the improvement ratio expected from the case of containing only boron (Comparative Example 8) and the case of containing only aluminum (Comparative Example 9), because the improvement ratio is 208% according to Comparative Example 10 containing both boron and aluminum, whereas the improvement ratio of the capacity retention ratio according to Comparative Example 8 containing only boron and the improvement ratio thereof according to Comparative Example 9 containing only aluminum are respectively 202% and −1%, based on Comparative Example 7 in which the positive active material layer contains neither boron nor aluminum. No significant difference has been observed from the improvement ratio expected from the case of containing only boron (Comparative Example 8) and the case of containing only aluminum (Comparative Example 9), because the improvement ratio is 118% according to Comparative Example 10 containing both boron and aluminum, whereas the improvement ratio of the maximum thickness of the energy storage device according to Comparative Example 8 containing only boron and the improvement ratio thereof according to Comparative Example 9 containing only aluminum are respectively 109% and 0%, based on Comparative Example 7 in which the positive active material layer contains neither boron nor aluminum.

For reference, Table 4 shows the discharge-capacity retention ratio and the maximum thickness of the energy storage

TABLE 3

|  | Positive active material layer | | Maximum voltage width (V) | Capacity retention ratio | | Thickness | |
|---|---|---|---|---|---|---|---|
|  | Presence or absence of boron | Presence or absence of aluminum |  | Number of cycles in which capacity retention ratio reaches 80% | Improvement ratio (%) with respect to Comparative Example 7 | Number of cycles in which thickness reaches 40 mm | Improvement ratio (%) with respect to Comparative Example 7 |
| Comparative Example 7 | Absence | Absence | 1.5 | 270 | 0 (reference) | 550 | 0 (reference) |
| Comparative Example 8 | Presence | Absence | 1.5 | 816 | 202 | 1150 | 109 |
| Comparative Example 9 | Absence | Presence | 1.5 | 266 | −1 | 550 | 0 |
| Comparative Example 10 | Presence | Presence | 1.5 | 832 | 208 | 1200 | 118 |

In contrast, as can be seen from Table 3, when the maximum voltage width is 1.5 V that is more than 1.1 V, device after 1000 cycles of the charge-discharge cycle test in Example 1 and Comparative Example 2.

TABLE 4

|  | Positive active material layer | | Maximum voltage width (V) | Capacity retention ratio (%) after 1000 cycles | Thickness (mm) after 1000 cycles |
| --- | --- | --- | --- | --- | --- |
|  | Presence or absence of boron | Presence or absence of aluminum | | | |
| Comparative Example 2 | Presence | Absence | 0.74 | 91.2 | 36.5 |
| Example 1 | Presence | Presence | 0.74 | 91.5 | 36.4 |

After 1000 cycles of the charge-discharge cycle test, there are almost no differences in the capacity retention ratio and the maximum thickness of the energy storage device between Example 1 in which the positive active material layer contains boron and aluminum and Comparative Example 2 in which the positive active material layer contains only boron. Accordingly, the energy storage device according to an aspect of the present invention can be considered producing a remarkable effect of being capable of suppressing the decrease in capacity and the swelling of the energy storage device in the case of a long-term charge-discharge cycle of several thousand cycles.

As described above, it has been demonstrated that when the positive active material layer contains boron and aluminum, with the maximum voltage width of 1.1 V or less, the energy storage device is more effectively improved not to swell in addition to being improved not to have a capacity decreased due to a long-term charge-discharge cycle.

The present invention is suitably used as an energy storage device for use as a power source for electronic devices such as personal computers and communication terminals, automobiles, and the like. In particular, the present invention is suitably used for power storage in which the replacement is difficult once an energy storage device is installed, a high capacity is maintained for a long period of time, and it is highly necessary to suppress swelling of the energy storage device.

DESCRIPTION OF REFERENCE SIGNS

1: energy storage device
2: electrode assembly
3: case
4: positive electrode terminal
41: positive electrode lead
5: negative electrode terminal
51: negative electrode lead
20: energy storage apparatus
30: energy storage system

The invention claimed is:

1. An energy storage apparatus comprising a plurality of energy storage devices and a voltage controller, wherein each of the plurality of energy storage devices includes a positive electrode including a positive active material layer, a negative electrode, and a nonaqueous electrolyte, the positive active material layer contains, as a positive active material, a lithium transition metal composite oxide containing cobalt, manganese, and nickel, and the positive active material layer contains boron and aluminum, an atomic ratio of nickel to a total of cobalt, manganese, and nickel in the lithium transition metal composite oxide is 0.4 or more and less than 1.0, and the voltage controller is configured to control the plurality of energy storage devices such that a maximum voltage width that is a difference between a charge upper limit voltage and a discharge lower limit voltage under normal usage is 1.1 V or less.

* * * * *